(12) United States Patent
Choi et al.

(10) Patent No.: US 11,347,266 B2
(45) Date of Patent: May 31, 2022

(54) COVER GLASS AND MANUFACTURING METHOD THEREOF

(71) Applicant: Samsung Display Co., Ltd., Yongin-si (KR)

(72) Inventors: Beom Gyu Choi, Seoul (KR); Youn Kyun Bin, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 180 days.

(21) Appl. No.: 16/043,248

(22) Filed: Jul. 24, 2018

(65) Prior Publication Data

US 2019/0187757 A1 Jun. 20, 2019

(30) Foreign Application Priority Data

Dec. 14, 2017 (KR) .......................... 10-2017-0172413

(51) Int. Cl.
*G06F 1/16* (2006.01)
*G02F 1/1333* (2006.01)

(52) U.S. Cl.
CPC .......... *G06F 1/1652* (2013.01); *G06F 1/1626* (2013.01); *G02F 1/133331* (2021.01)

(58) Field of Classification Search
None
See application file for complete search history.

(56) References Cited

U.S. PATENT DOCUMENTS

| 9,187,358 B2 | 11/2015 | Luo et al. |
| 9,656,899 B2 | 5/2017 | Luo et al. |
| 10,399,885 B2 | 9/2019 | Lee |
| 10,723,647 B2 | 7/2020 | Lee |
| 2014/0162029 A1 | 6/2014 | Takeuchi et al. |
| 2015/0000340 A1* | 1/2015 | Jang ..................... C03B 23/0302 65/106 |
| 2018/0037488 A1* | 2/2018 | Liu ........................ C03C 21/002 |

FOREIGN PATENT DOCUMENTS

| CN | 105377781 A | 3/2016 |
| CN | 106313425 A | 1/2017 |
| CN | 106746540 A | 5/2017 |
| JP | 5510693 B1 | 4/2014 |
| KR | 1020120085365 A | 8/2012 |
| KR | 1020130094570 A | 8/2013 |
| KR | 1020160025685 A | 3/2016 |
| KR | 1020170051597 A | 5/2017 |
| KR | 1020170119796 A | 10/2017 |

OTHER PUBLICATIONS

Chinese Office Action for Chinese Patent Application No. 201811441102.1 dated Oct. 11, 2021.

* cited by examiner

*Primary Examiner* — Queenie S Dehghan
(74) *Attorney, Agent, or Firm* — Cantor Colburn LLP

(57) ABSTRACT

A cover glass includes: a flat portion disposed on a display panel which is curved and displays an image; and curved portions respectively extending from opposing ends of the flat portion. A virtual straight line is defined perpendicular to the flat portion, end surfaces of the curved portions respectively form an angle of about 90 degrees to 180 degrees with respect to the virtual straight line, and the curved portions forming the angle of about 90 degrees to 180 degrees with respect to the virtual straight line include end portions of a preliminary cover glass which are bent by engagement of a lower mold with an upper mold having the preliminary cover glass disposed therebetween

8 Claims, 14 Drawing Sheets

COVER GLASS AND MANUFACTURING METHOD THEREOF

This application claims priority to Korean Patent Application No. 10-2017-0172413 filed on Dec. 14, 2017, and all the benefits accruing therefrom under 35 U.S.C. § 119, the content of which in its entirety is incorporated herein by reference.

BACKGROUND

(a) Field

The present disclosure relates to a cover glass and a method for manufacturing the same, and more particularly, relates to a cover glass that includes a curved portion bent at 90 degrees or more, and a method for manufacturing the same.

(b) Description of the Related Art

Mobility-based electronic devices have been widely used. As a mobility-based electronic device, a tablet personal computer ("PC") has been widely used in addition to a relatively small-sized electronic device such as a mobile phone.

Such a mobile electronic device includes a display portion that generates and provides visual information such as an image or a video in order to support various functions. As other parts for driving the display portion have become smaller, a proportion of the display portion in the electronic device has been gradually increasing, and a structure in which the display portion generally disposed in a flat state includes a portion which can be bent at a predetermined angle has been developed. Accordingly, a cover glass included in the mobile electronic device may conform to the bent structure of the display portion.

SUMMARY

The invention has been made in an effort to provide cover glass of which edges thereof are bent at over 90 degrees, and a method for manufacturing the cover glass.

A cover glass according to an exemplary embodiment of the present invention includes: a flat portion; and curved portions that are disposed at opposite edges of the flat portion, wherein a virtual straight line that is perpendicular to the flat portion, and ends of the curved portions, form an angle of about 90 degrees to 180 degrees, and a bottom surface of the flat portion includes at least one of grooves that are formed in parallel with one edge of the curved portions.

A method for manufacturing cover glass according to an exemplary embodiment of the invention includes: preparing a lower mold including a plurality of mold portions, where the mold portions assembled consecutive with each other collectively form an upper surface of the lower mold, the upper surface of the lower mold corresponds to a shape of the cover glass which is disposed on a curved display panel which displays an image and the shape of the cover glass including a curved portion at an end thereof; disposing a preliminary cover glass respectively between a lower surface of an upper mold and each of the mold portions assembled consecutive with each other; applying compression to the preliminary cover glass between the upper and lower molds by engagement of the lower and upper molds with each other, where the compression forms the curved portion of the cover glass from an end portion of the preliminary glass cover, and the engagement of the lower and upper molds engages at least one mold portion of the lower mold with the curved portion of the cover glass which is formed from the end portion of the preliminary glass cover; and after the engagement of the lower and upper molds, from among the plurality of mold portions removing from the lower mold: a mold portion which is disengaged from the curved portion of the cover glass while the at least one mold portion remains engaged with the curved portion of the cover glass; and after removing the mold portion which is disengaged from the curved portion of the cover glass, removing the at least one mold portion from engagement with the curved portion of the cover glass.

The shape of the cover glass may further include a flat portion and the curved portion provided in plurality extending from opposing ends of the flat portion, a virtual straight line may be defined perpendicular to the flat portion, and end surfaces of the curved portions may each form an angle of about 90 degrees to 180 degrees with respect to the virtual line.

The plurality of mold portions may include a first mold, a second mold and a third mold consecutively disposed in order to form the upper surface of the lower mold which corresponds to the shape of the cover glass.

An outer edge of an upper surface of each of the first mold and the third mold may be disposed furthest from the second mold, the outer edge of the upper surface of the first mold or the third mold may include a curved surface, and the engagement of the lower and upper molds may engage the curved surface of the respective first mold or third mold at the outer edge thereof with the curved portion of the cover glass.

Among the first to third molds consecutively disposed, the second mold may be the mold portion which is disengaged from the curved portion of the cover glass, the respective first mold or third mold may be the at least one mold portion which is engaged with the curved portion of the cover glass, and the second mold may be removed while the respective first mold or third mold remains engaged with the curved portion of the cover glass.

The lower mold may further include a fixing portion including protruding portions spaced apart from each other and between which the plurality of mold portions are received to be spaced apart from each of the protruding portions.

The preliminary cover glass respectively disposed between the lower surface of an upper mold and each of the mold portions assembled consecutive with each other may include a curved surface at an end thereof corresponding to the curved portion of the cover glass.

The preliminary cover glass may include a flat portion, the curved surface of the preliminary cover glass extending from an end of the flat portion thereof to be bent at an angle of less than 90 degrees with respect to a virtual straight line defined perpendicular to the flat portion.

A shape of the lower surface of the upper mold may correspond to a shape of the upper surface of the lower mold collectively formed by the mold portions assembled consecutive with each other, and an outer edge of the lower surface of the upper mold may include a curved surface corresponding to the curved portion of the cover glass at the end thereof.

A mold according to an exemplary embodiment of the invention includes: a lower mold including a plurality of mold portions removably disposed with each other and collectively forming an upper surface of the lower mold, the upper surface corresponding to a shape of a cover glass which is disposed on a curved display panel which displays an image, the shape of the cover glass including a curved portion at an end thereof, and a fixing portion including protruding portions spaced apart from each other and between which the plurality of mold portions are received to be spaced apart from each of the protruding portions; and an upper mold facing the lower mold. Where the plurality of mold portions includes a first mold, a second mold and a third mold assembled consecutively in order between the protruding portions of the fixing portion to form the upper surface of the lower mold, and within the fixing portion each of the first mold and the third mold are spaced apart from a respective protruding portion adjacent thereto.

An outer edge of each of the first mold and the third mold which is closest to the respective protruding portion includes a curved surface.

Among the first to third molds assembled consecutively in order between the protruding portions of the fixing portion to form the upper surface of the lower mold, an upper surface of each of the first to third molds may include a flat portion facing the upper mold, and outer edges of the first mold and the third mold may be curved at an angle of less than 90 degrees with respect to a virtual line perpendicular to the respective flat portion thereof.

The upper mold may define a lower surface facing the upper surface of the lower mold, a shape of the lower surface corresponding to a shape of the upper surface of the lower mold collectively formed by the first to third molds assembled consecutively in order between the protruding portions of the fixing portion.

According to one or more exemplary embodiment, a cover glass of which edges are bent over 90 degrees, and a method for manufacturing the same are provided.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
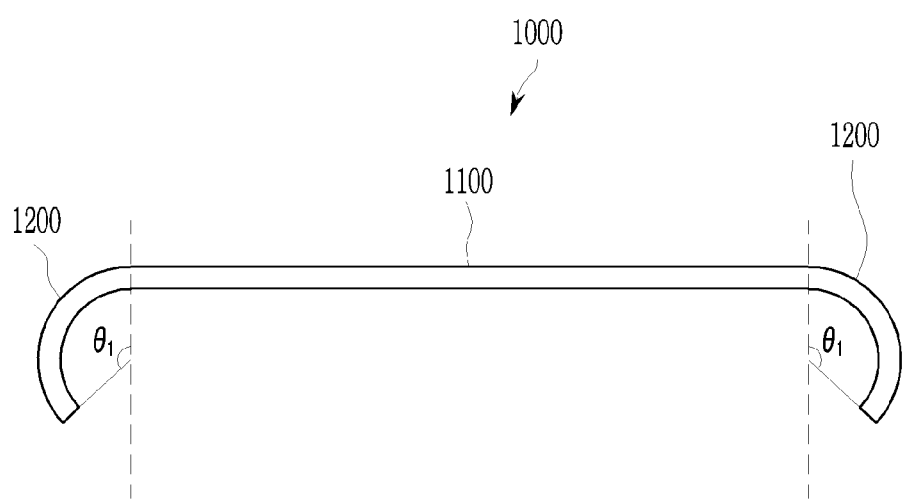
FIG. 1 shows a cross-sectional view of an exemplary embodiment of a cover glass according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

The drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the invention is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being related to another element such as being "on" another element, it can be directly on the other element or intervening elements may also be present. In contrast, when an element is referred to as being related to another element such as being "directly on" another element, there are no intervening elements present. Further, the word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

In addition, in this specification, the phrase "on a plane" means viewing a target portion from the top, and the phrase "on a cross-section" means viewing a cross-section formed by vertically cutting a target portion from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The invention relates to a cover glass of which edges are bent over 90 degrees, a method for manufacturing the cover glass, and a mold used in the manufacturing method.

Hereinafter, exemplary embodiments of a cover glass and a display device including the same, according to the invention will be described.

FIG. 1 shows a cross-sectional view of an exemplary embodiment of a cover glass according to the invention. Referring to FIG. 1, a cover glass 1000 according to the exemplary embodiment of the invention includes a flat portion 1100 and a curved portion 1200 provided in plurality at opposite edges of the flat portion 1100. An angle θ1 formed by a virtual straight line that is perpendicular to the flat portion 1100 and a distal end of the curved portions 1200 is between about 90 degrees and about 180 degrees. In an embodiment, a virtually extended line of an end surface of the curved portion 1200 at a distal end thereof forms the angle between about 90 degrees and about 180 degrees with respect to the virtual straight line.

That is, in exemplary embodiments, each of the curved portions 1200 of the cover glass 1000 according to the present exemplary embodiment are bent at over 90 degrees relative to the virtual straight line, forming an obtuse angle. When the cover glass 1000 is applied to a display area of a display device, the display area of the display device is widened.

The cover glass 1000 and portions thereof may be disposed in a plane defined by first and second directions which cross each other. In FIG. 1, the first and second directions may be the horizontal direction and a direction into the page, respectively, or vice-versa. The cover glass 1000 in FIG. 1 may be considered to be disposed in an overall flat state. A thickness of the overall cover glass 1000 is extended in a third direction which crosses each of the first and second directions. The curved portions 1200 may be considered as extending along the horizontal and thickness directions of the overall cover glass 1000. A thickness of the cover glass 1000 at various locations thereof may be taken as a distance between upper and lower surfaces thereof at a respective location.

Figure 2:
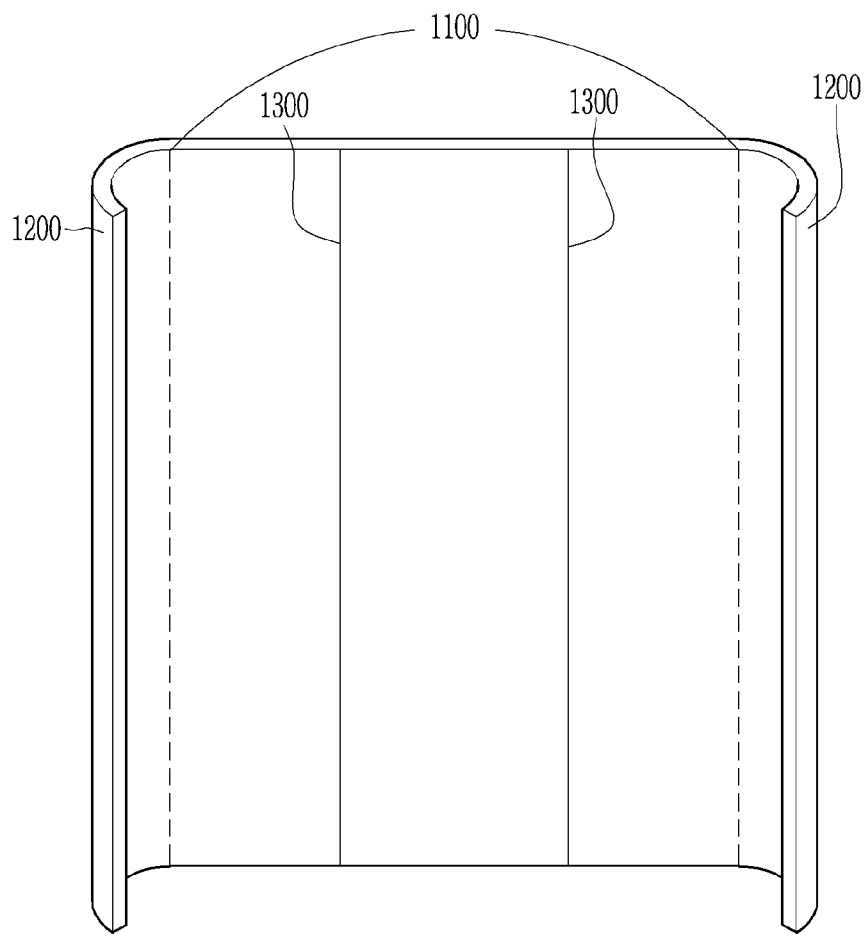
FIG. 2 shows a plan view of an exemplary embodiment of a bottom surface of the cover glass of FIG. 1 according to the invention.

FIG. 2 shows a plan view of an exemplary embodiment of a bottom side of the cover glass 1000 of FIG. 1 according to the invention. In FIG. 2, the first and second directions may be the horizontal and vertical directions, respectively, or vice-versa. The cover glass 1000 of FIG. 1 may be rotated such that a plane of the bottom side thereof is viewable.

A length of the cover glass 1000 and portions thereof such as the curved portion 1200 may extend in the vertical direction, while a width of these elements is taken in the horizontal direction. Edges of the flat portion 1100 are respectively indicated by two dotted lines in FIG. 2, where a width of the flat portion 1100 may be taken as a distance between these two dotted lines.

Referring to FIG. 2, a groove 1300 may be disposed at the bottom side of the cover glass 1000, that is, an interior side to which the curved portions 1200 are curved. The groove 1300 may be recessed from a bottom surface of the glass cover 1000 such as the bottom surface at the flat portion 1100. The groove 1300 may be provided in plurality spaced apart from each other along the horizontal direction. The groove 1300 may be disposed or formed in parallel with the lengths of the curved portion 1200.

In an exemplary embodiment of a method of manufacturing a glass cover, the grooves 1300 are generated during a manufacturing process, and can be subsequently removed through a surface treatment process before the cover glass 1000 is attached on a display panel of a display device. As the grooves 1300 can be removed by the surface treatment, the grooves 1300 of the cover glass 1000 may not be seen in a finally-formed display device to which the cover glass 1000 is applied.

Figure 3:
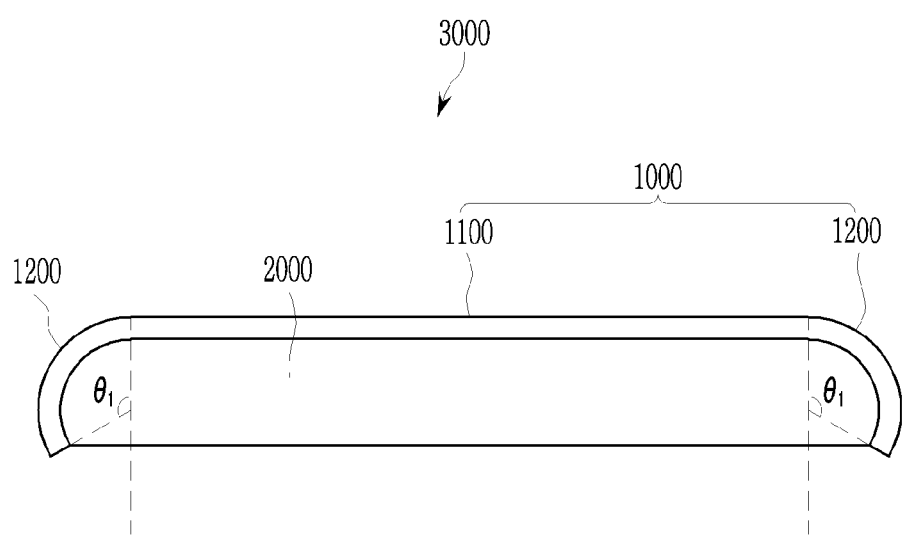
FIG. 3 shows a cross-sectional view of an exemplary embodiment of a display device to which the cover glass of FIG. 1 is applied according to the invention.

FIG. 3 shows an exemplary embodiment of a display device 3000 to which the cover glass 1000 is applied. The display device 3000 includes a display panel 2000 and a cover glass 1000 provided above the display panel 2000, at a viewing side of the display device 3000. The cover glass 1000 may form an outer surface of the display device 3000. An image generated and displayed by the display panel 2000 are viewable from outside the display device 3000 through the cover glass 1000 thereof.

The display device 3000 includes a display area at which the image is displayed and a non-display area at which the image is not displayed. The cover glass 1000 is disposed at the display area of the display device 3000, and may be further disposed at the non-display area thereof without limitation.

The cover glass 1000 is the same as that of FIG. 1. That is, the cover glass includes a flat portion 1100 and a curved portion 1200 which is provided in plurality at opposite edges of the flat portion 1100. An angle θ1 formed by a virtual straight line that is perpendicular to the flat portion 1100 and distal ends of the curved portions 1200 is between about 90 degrees and about 180 degrees. The flat portion 1100 of the cover glass 1000 is disposed in the display area of the display device 3000. One or both of the curved portions 1200 may also be disposed in the display area of the display device 3000. In this case, an overall display area of the display device 3000 is widened such that a user's demand for a relatively large screen in the display device 3000 can be satisfied.

The display panel 2000 may generate and display the image by using light which is generated and emitted within the display panel 2000 or by using light which is generated outside of the display panel 2000 and emitted thereto. Types of the display panel 2000 within the display device 3000 according to the invention are not limited. The display panel 2000 may be a liquid crystal display ("LCD") which receives light from outside thereof or an organic light emitting diode ("OLED") display which generates and emits light therein. In addition, the display panel 2000 may be a display panel of which an inorganic material or quantum dots are used as a light emission layer to generate and emit the light for generating and displaying an image.

Next, an exemplary embodiment of a method for manufacturing the cover glass 1000 of which the curved portions 1200 are each bent over 90 degrees as shown in FIG. 1 will be described. When the curved portions 1200 of a finally-formed cover glass 1000 are bent over 90 degrees as described above, typical upper and lower molds may not be used, since the curved portions 1200 may surround side surfaces and a bottom surface of the lower mold. In this case, the curved portions 1200 may be damaged when the lower mold is removed from engagement with the formed cover glass 1000. However, according to one or more exemplary embodiment of the method for manufacturing the cover glass 1000 according to the invention, the cover glass 1000 of which curved portions are bent over 90 degrees can be manufactured by using a lower mold having a separated structure in which portions thereof are removably disposed with each other.

FIG. 4 to FIG. 10 are cross-sectional view of processes within an exemplary embodiment of a method of manufacturing the cover glass 1000 according to the invention.

Figure 4:
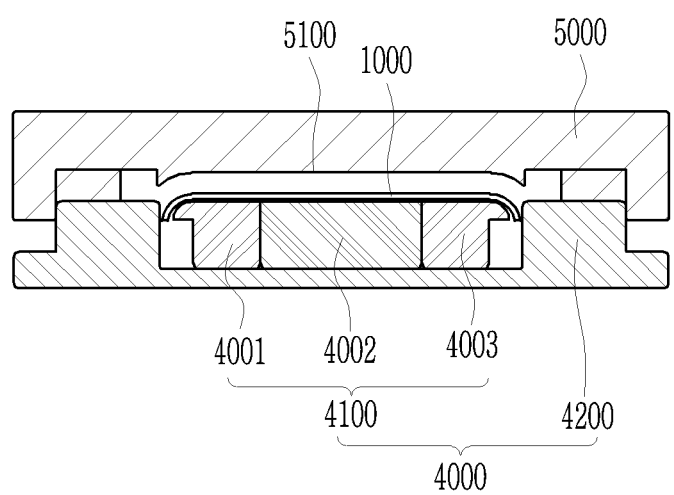
FIG. 4 to FIG. 10 are cross-sectional views of processes within an exemplary embodiment of a method of manufacturing a cover glass according to the invention.

Referring to FIG. 4, a lower mold 4000 and an upper mold 5000 are prepared, and then a pre-bent cover glass (labeled 1000 in FIG. 4) is placed on the lower mold 4000.

In FIG. 4, the lower mold 4000 includes a fixing portion 4200 including a protruded portion or wall provided in plurality and a molding portion 4100. The protruded portions of the fixing portion 4200 are connected to each other by a connection portion extending under the molding portion 4100. At the connection portion, an empty space is defined between the protruded portions of the fixing portion 4200 which are arranged separated from each other. The molding portion 4100 defines an empty space therein, and the molding portion 4100 is received in the empty space between the protruded portions of the fixing portion 4200.

The molding portion 4100 includes a first mold (portion) 4001, a second mold (portion) 4002 and a third mold (portion) 4003. The first, second and third molds 4001, 4002 and 4003 may be removably disposed relative to each other. Although it is illustrated in FIG. 4 that the molding portion 4100 includes three molds, the molding portion 4100 may include more than three molds. However, when the molding portion 4100 includes less than three molds, a molded cover glass formed from the pre-bent cover glass (1000 in FIG. 4) cannot be effectively removed from the mold, such that in exemplary embodiments according to the invention the number of molds of the molding portion 4100 is at least three.

Referring to FIG. 4, the second mold 4002 is disposed between the first mold 4001 and the third mold 4003, in a direction corresponding to the width of the pre-bent cover glass (1000 in FIG. 4). One outer edge of each of the first mold 4001 and the third mold 4003 which is disposed furthest from a center of the molding portion 4100 includes a curved surface. The curved surfaces at the outer edges of the first and third molds 4001 and 4003 respectively correspond to the curved portions 1200 of the finally formed cover glass (1000 in FIG. 1).

That is, upper (surface) portions of the first, second and third molds 4001, 4002 and 4003 each correspond to the flat portion 1100 of the finally-formed cover glass (1000 in FIG. 1), and curved surfaces at the outer edges of each of the first and third molds 4001 and 4003 respectively correspond to the curved portions 1200 of the finally-formed cover glass (1000 in FIG. 1).

The upper surfaces of the first, second and third molds 4001, 4002 and 4003 may be disposed coplanar with each other, to correspond to the flat portion 1100 of the finally-formed glass cover (1000 in FIG. 1). The outer edges of each of the first and third molds 4001 and 4003 may include curved portions bent at about 90 degrees with respect to a plane parallel to that of the plane in which the upper surfaces of the first, second and third molds 4001, 4002 and 4003 are disposed. However, in exemplary embodiments, the angle at which the curved surfaces of the first and third molds 4001 and 4003 are bent may not exceed 90 degrees. A finally-formed cover glass having curved surfaces that are bent over 90 degrees as described above can be molded from a pre-bent cover glass by using a first mold 4001 and a third mold 4003, each of which having curved surfaces at outer edges thereof that are bent at 90 degrees or less relative to a plane in which the upper surfaces thereof are disposed. A detailed method related thereto will be additionally described later with reference to FIG. 5.

The upper mold 5000 includes a matching surface 5100 of which a profile or shape thereof matches that formed by the molding portion 4100 of the lower mold 4000. The matching surface 5100 faces the collective upper surface of the molding portion 4100 defines by upper surface of the first, second and third molds 4001, 4002 and 4003. The matching surface 5100 of the upper mold 5000 has a shape that is engageable with the collective upper surface of the molding portion 4100 of the lower mold 4000. When the upper mold 5000 and the lower mold 4000 are engaged with each other, a portion of the upper mold 5000 defining the matching surface 5100 is disposed in an empty space defined between each of the protruded portions of the fixing portion 4200 and the molding portion 4100 of the lower mold 4000. Accordingly, movement of the molding portion 4100 during a compression process is reduced or effectively prevented.

Referring to FIG. 4, a preliminary cover glass 1000 is placed between the lower mold 4000 and the upper mold 5000. In an exemplary embodiment the preliminary cover glass 1000 prepared at this point may be completely flat having no curved edge portions. Alternatively, as shown in FIG. 4, the preliminary cover glass 1000 may include curved portions at edges thereof to define a pre-bent cover glass 1000.

Referring to FIG. 4, the maximum angle of the curved surface provided at each of the opposite outer edges of the molding portion 4100 of the lower mold 4000 is 90 degrees with respect to a virtual line extended perpendicular to the collective upper surface of the molding portion 4100. When the curved surface of the molding portion 4100 is bent to be greater than 90 degrees, an area or volume where the upper mold 5000 and the lower mold 4000 are not engageable with each other is generated, and the outer opposing edges of the cover glass 1000 cannot be effectively molded in such area.

Accordingly, in one or more embodiment of a mold according to the invention, an angle formed by the curved outer surfaces of the edges of the lower mold 4000 and a plane parallel to that in which the upper surfaces of the first, second and third molds 4001, 4002 and 4003 are disposed does not exceed 90 degrees. When the preliminary cover glass in a flat state is applied to the lower mold 4000 having such a structure to mold the flat-state preliminary cover glass, the maximum angle of the curved portions 1200 of the molded cover glass formed from such flat-state preliminary glass cover also does not exceed 90 degrees.

However, in one or more exemplary embodiment of a method of manufacturing a glass cover, when the preliminary cover glass (1000 in FIG. 4) of which outer edges having curved portions are formed in advance and then molded by using the upper mold 5000 and the lower mold 4000 each having the structure of FIG. 4, the already-formed curved portions 1200 of the pre-bent glass cover may be further bent by the lower mold 4000 to form an angle greater than 90 degrees as described above for the glass cover 1000 of FIG. 1.

Figure 5A:
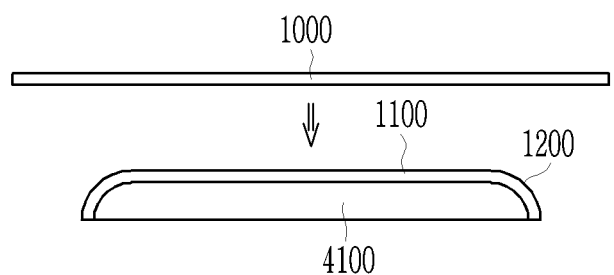
Figure 5B:
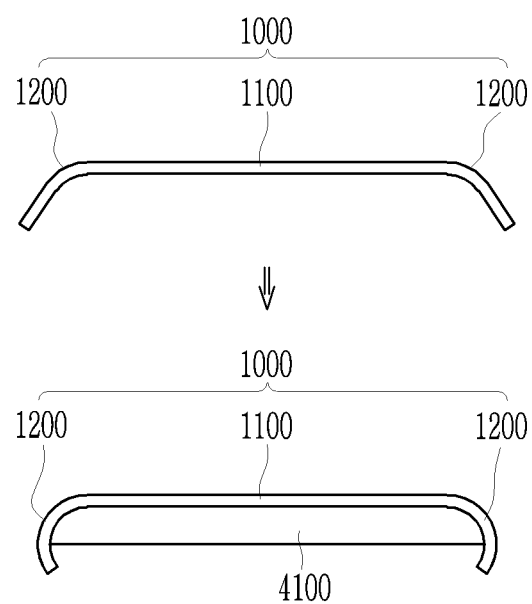

FIGS. 5(*a*) and 5(*b*) respectively show cross-sectional views of processes within exemplary embodiments of a method of forming a glass cover from preliminary glass covers having different shapes from each other. The cross-sectional views of FIG. 5(*a*) and FIG. 5(*b*) shows a difference between when a pre-bent preliminary cover glass is molded and when a flat preliminary cover glass is molded. FIG. 5(*a*) shows a result of molding of the flat preliminary cover glass 1000 (top view) by using the molding portion 4100. Referring to the bottom view in FIG. 5(*a*), the maximum angle of the curved portions 1200 of the finally-bent cover glass 1000 is only about 90 degrees with respect to a virtual line extended perpendicular to the flat portion thereof 1100.

However, referring to FIG. 5(*b*), when the preliminary cover glass 1000 (top view) includes the pre-molded curved portions 1200, the curved portions 1200 are further bent by the curved surfaces of the molding portion 4100 such that the curved portions 1200 of the finally-bent cover glass 1000 (bottom view) can be bent over 90 degrees with respect to a virtual line extended perpendicular to the flat portion thereof 1100.

That is, the preliminary cover glass 1000 of FIG. 4 may be the flat cover glass 1000 as shown in the top view of FIG. 5(*a*) or may be the pre-bent cover glass 1000 as shown in the top view of FIG. 5(*b*). When the flat cover glass of FIG. 5(*a*) is used, opposing ends of the curved portions 1200 of the finally manufactured cover glass 1000 (bottom view in FIG. 5(*a*)) form 90 degrees with the flat portion 1100 of the cover glass 1000. However, when the pre-bent cover glass 1000 of FIG. 5(*b*) is used, an angle formed by opposing ends of the curved portions 1200 of the finally manufactured cover glass 1000 and the flat portion 1100 thereof may exceed 90 degrees.

Figure 6:
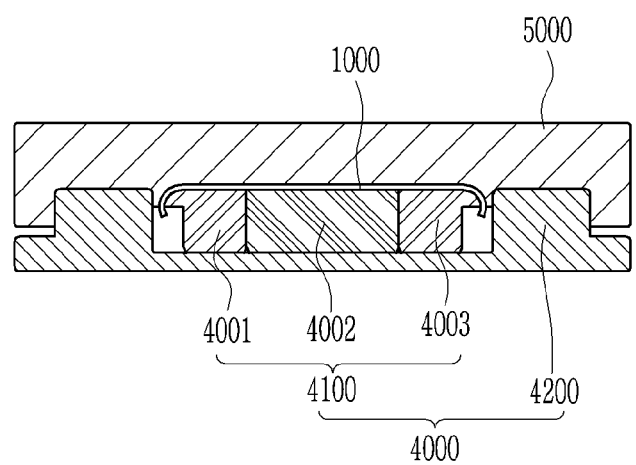

Referring to FIG. 6, the upper mold 5000 is moved relative to the lower mold 4000 to as to compress the preliminary glass cover 1000 therebetwen. In this case, heat may be applied to the preliminary cover glass 1000 through the lower mold 4000 and the upper mold 5000. The heat may be applied to the preliminary cover glass 1000 during compression thereof. The preliminary cover glass 1000 is deformed to confirm to the shape of the molding portion 4100 of the lower mold 4000 by the heat and pressure.

In this case, as previously described with reference to FIG. 5(*b*), since the preliminary cover glass 1000 has been pre-bent at outer edges thereof, the pre-bent outer edges of the preliminary cover glass 1000 may be further bent by interfacing with the curved upper surface of the molding portion 4100 bent at an angle as described above. That is, as shown in FIG. 6, the pre-bent outer edges of the cover glass 1000 are further bent to form an obtuse angle greater than 90 degrees while being rolled at the molding portion 4100.

As discussed above, when the upper mold 5000 and the lower mold 4000 are engaged with each other, a portion of the upper mold 5000 defining the matching surface 5100 is disposed in an empty space respectively defined between each of the protruded portions of the fixing portion 4200, and the molding portion 4100 of the lower mold 4000. The outer edges of the cover glass 1000 are further bent by insertion of the portion of the upper mold 5000 defining the matching surface 5100 into the empty space.

Figure 7:
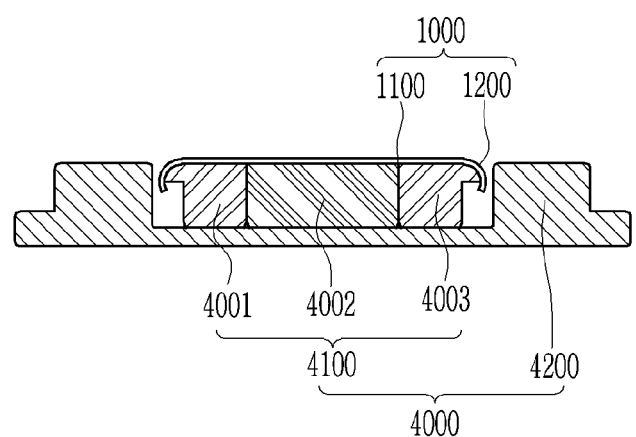

Referring to FIG. 7, the upper mold 5000 and the lower mold 4000 are separated from each other so as to remove the upper mold 5000 from remaining portions of the structure shown in FIG. 6. The finally-formed cover glass 1000 shown in FIG. 7 is molded from a pre-bent structure thereof to a structure including the flat portion 1100 and the curved portions 1200, by the upper mold 5000 and the pressure and heat of the lower mold 4000 engaged with the upper mold 5000.

Figure 8:
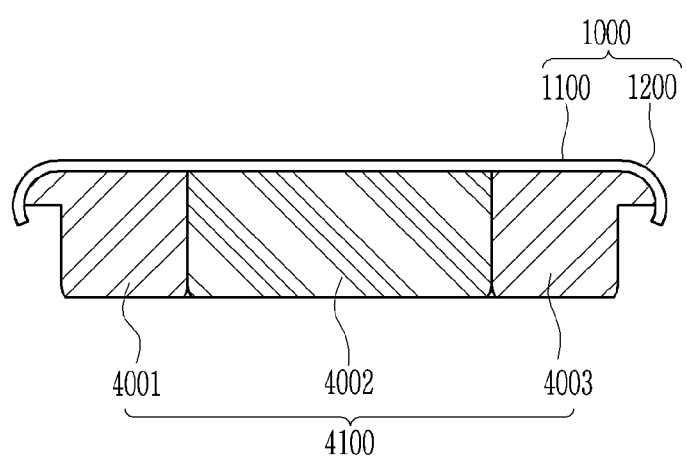

Referring to FIG. 8, the molding portion 4100 and the fixing portion 4200 are separated from each other such that the molding portion 4100 is removed from the space between the protruded portions of the fixing portion 4200 of the lower mold 4000. In the previous operation, the molding portion 4100 of the lower mold 4000 is received within the space between the protruded portions of the fixing portion 4200 such that a lower (surface) portion of the molding portion 4100 is covered by the connection portion of the fixing portion 4200 and not exposed to outside the mold. In FIG. 8, by separating the molding portion 4100 and the fixing portion 4200 from each other, a lower portion of the molding portion 4100 is no longer covered by the connection portion of the fixing portion 4200 and exposed to outside the mold.

Figure 9:
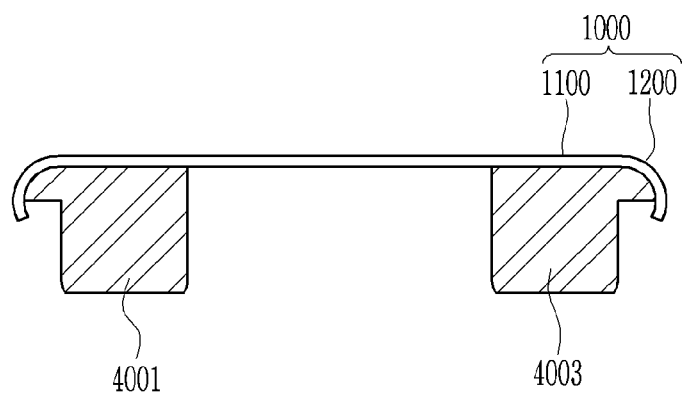

Referring to FIG. 9, the second mold 4002 that is disposed in the middle of the lower mold 4100 is removed from between the first and third molds 4001 and 4003. The outer ends of the first and third molds 4001 and 4003 having the curved surfaces are engaged with and contact the curved ends of the cover glass 1000. The second mold 4002 can be relatively easily taken out because the second mold 4002 is not engaged with and does not contact the curved portions 1200 of the cover glass 1000.

Figure 10:
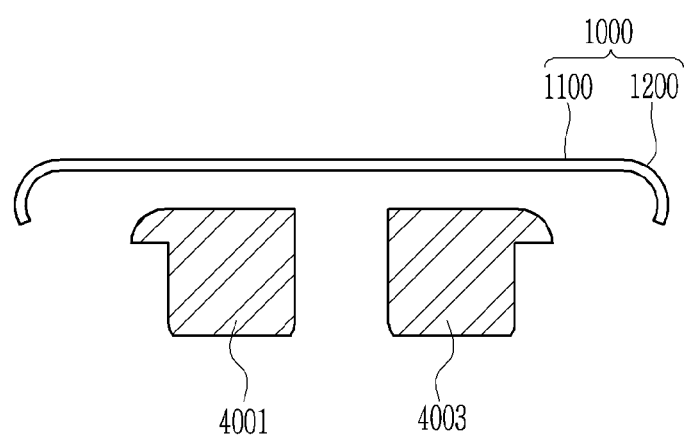

Referring to FIG. 10, the first mold 4001 and the third mold 4003 respectively engaged with and contacting the curved ends of the cover glass 1000 are separated from the cover glass 1000. In this case, since the second mold 4002 is removed from between the first and third molds 4001 and 4003, an empty space is formed at a center portion of the lower molding 4100 portion. With the space between the first and third molds 4001 and 4003, the first mold 4001 is moved away from a curved end of the glass cover 100 toward the center portion thereof to detach the first mold 4001 from the curved portion 1200 of the cover glass 1000. The first mold 4001 may be moved along a direction which is parallel to the plane in which the flat portion 1100 of the cover glass 1000 is disposed.

Once the first mold 4001 is disengaged from the glass cover 1000, the first mold 4001 can be separated from the glass cover 1000 such as in a direction perpendicular to the plane in which the flat portion 1110 is disposed and through an area corresponding to a bottom of the lower mold 4000.

A same process may be applied for separating the third mold 4003 from the glass cover 1000.

That is, since the curved portions 1200 of the cover glass 1000 each have an obtuse angle of over 90 degrees as described above, separating a molding portion having a unitary structure from the curved portions 1200 of the glass cover 1000 may be difficult. In a conventional method of manufacturing a glass substrate, for example, when the molding portion has a unitary structure, the curved portions 1200 may be damaged while the unitary molding portion is moved in a direction perpendicular to the plane in which the flat portion 1100 is disposed to be separated therefrom through the bottom portion of the mold since the edges of the molding portion are surrounded by the curved portions 1200 of the glass cover 1000.

However, in one or more exemplary embodiment of a method for manufacturing the cover glass 1000 according to the invention, the molding portion 4100 of the lower mold 4000 is formed by combining three or more mold portions which are separable from or removable with respect to each other. Thus, the molding portion 4100 can be removed from engagement with a formed cover glass 1000 without causing damage to the curved portions 2100 thereof even when the curved portions 1200 of the cover glass 1000 are bent at an obtuse angle to surround outer ends of the molding portion 4100.

However, since the molding portion 4100 is formed of a combination of three or more molds rather than having a unitary structure, grooves of the cover glass 1000 may be formed at the lower surface thereof respectively corresponding to positions of interfaces between the first mold 4001, the second mold 4002 and the third mold 4003. That is, a cross-sectional thickness of the cover glass 1000 may vary at positions thereof corresponding to a height difference formed between the first, second and third molds 4001, 4002 and 4003 relative to each other and/or a groove may be formed at a periphery of the interface during a manufacturing process.

Thus, a process for performing a surface treatment on the cover glass 1000 may be further included after the lower mold 4000 separated from the cover glass 1000. An impurity (e.g., groove, thickness variation, etc.) in the lower surface of the cover glass 1000 is removed by the surface treatment process, such that a non-uniformity problem between the molding portion 4100 and the bottom surface of the cover glass 1000 can be resolved and the bottom surface of the cover glass 1000 having the impurity becomes completely flat.

Figure 11:
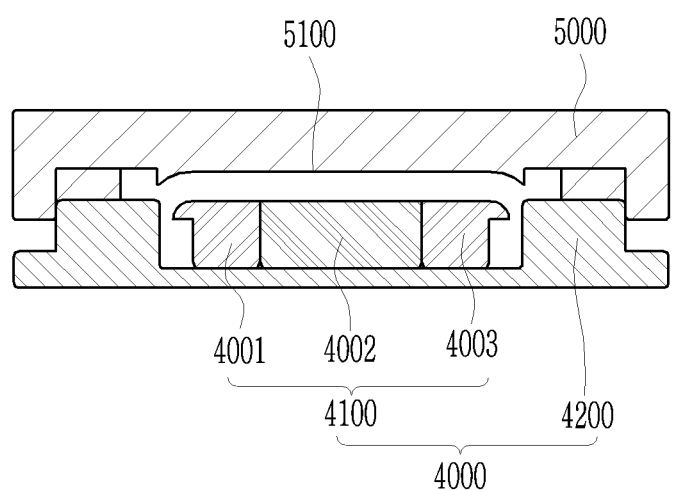
FIG. 11 shows a cross-sectional view of an exemplary embodiment of a mold for forming a glass cover according to the invention.

An exemplary embodiment of a mold according to the invention will be described. FIG. 11 shows a cross-sectional view of an exemplary embodiment of a mold according to the invention. Referring to FIG. 11, a mold according to an exemplary embodiment of the present invention includes a lower mold 4000 and an upper mold 5000 which are engageable with each other. FIG. 11 shows the upper and lower molds 5000 and 4000 facing each other, but not fully engaged with each other.

The lower mold 4000 includes fixing portion 4200 having protruding portions separated from each other and a molding portion 4100 which is disposed between the protruding portions. The fixing portion 4200 includes an empty space defined between the protruding portions thereof, and the molding portion 4100 is received in the empty space of the fixing portion 4200.

The molding portion 4100 includes a first mold 4001, a second mold 4002 and a third mold 4003 which are engageable with and detachable from each other. The second mold 4002 is disposed between the first mold 4001 and the third mold 4003 along a direction parallel to a plane parallel to a plane corresponding to the flat portion of the glass cover 1000 to be formed. An outer edge of each of the first mold 4001 and the third mold 4003 includes a curved surface. In this case, the outer edge of the curved portion of the first mold 4001, at the upper surface thereof, may be bent at less than 90 degrees. Likewise, the outer edge of the curved portion of the third mold 4003, at the upper surface thereof, may be bent at less than 90 degrees.

The upper mold 5000 includes or defines a matching surface 5100 which has a profile corresponding to that of a collective upper surface of the molding portion 4100 of the lower mold 4000. The matching surface 5100 has a shape such that the upper mold 5000 is engageable with the collective upper surface of the molding portion 4100 of the lower mold 4000. That is, an end of the lower surface at outer edges of the matching surface 5100 may be bent at the same angle as the end of the upper surface at the outer edge of the first mold 4100 and the outer edge of the second mold 4002.

Figure 12:
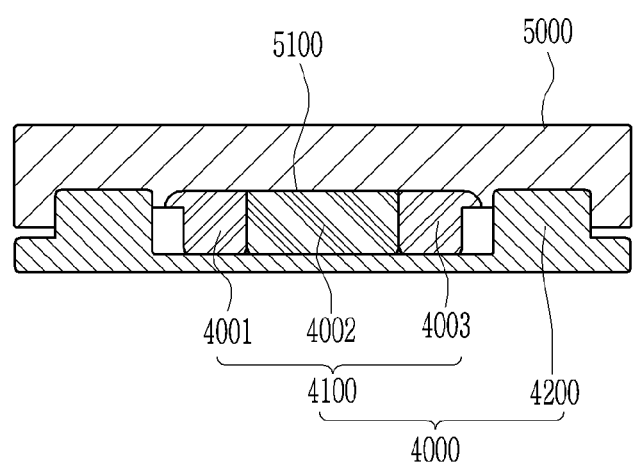
FIG. 12 shows a cross-sectional view of an exemplary embodiment of a structure in which molds are engaged with each other according to the invention.

FIG. 12 shows a cross-sectional view of an exemplary embodiment of a structure in which the upper and lower molds are engaged with each other according to the invention. When the upper mold 5000 and the lower mold 4000 are engaged with each other, a portion of the upper mold 5000 is disposed in an empty space between the protruding portion of the fixing portion 4200 and the molding portion 4100 of the lower mold 4000. More particularly, curved end portions of the upper mold 5000 at the matching surface 5100 of the upper mold 5000 fills the empty space. Since portions of the upper mold 5000 are disposed between the molding portion 4100 and the fixing portion 4200, movement of the molding portion 4100 during a compression process can be reduced or effectively prevented.

Figure 13:
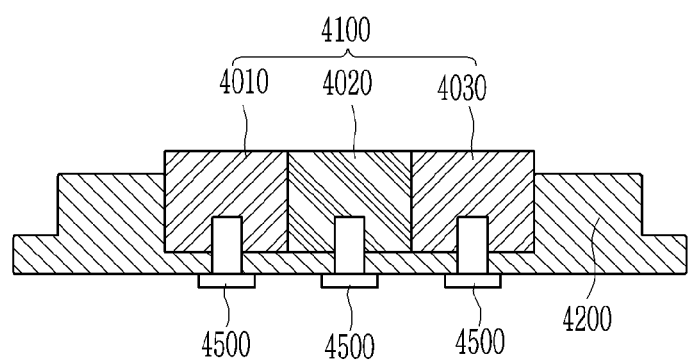
FIG. 13 and FIG. 14 show cross-sectional view of processes for manufacturing a lower mold according to the invention.
Figure 14:
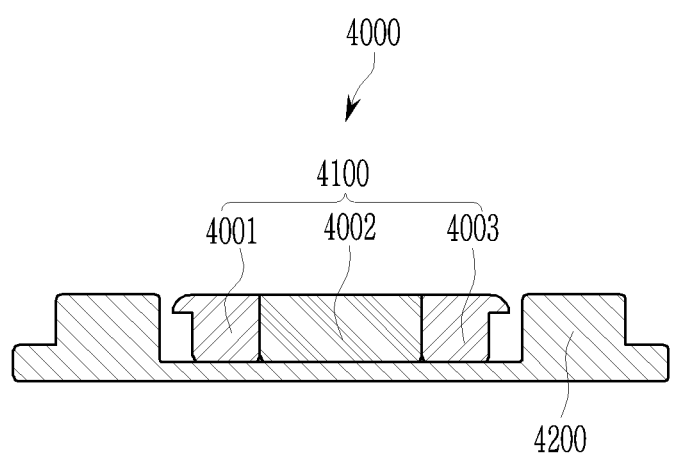

The first mold 4001, the second mold 4002 and the third mold 4003 of the molding portion 4100 of the lower mold 4000 can be manufactured through a single process. FIG. 13 and FIG. 14 show cross-sectional views of an exemplary embodiment of a manufacturing process of the lower mold 4000 according to the invention.

Referring to FIG. 13, a first portion 4010, a second portion 4020 and a third portion 4030 of a preliminary molding portion (4100 in FIG. 13) are placed in the fixing portion 4200, and the fixing portion 4200 and the respective portions 4010, 4020 and 4030 are fixed to each other such as by bolts 4500. The first portion 4010, the second portion 4020 and the third portion 4030 are simultaneously processed while the portions and the fixing portion 4200 are coupled to each other as shown in FIG. 13, such that the first mold 4001, the second mold 4002 and the third mold 4003 of the molding portion (4100 in FIG. 14) are formed at one time from the first portion 4010, the second portion 4020 and the third portion 4030, respectively.

FIG. 14 shows the lower mold 4000 including the molding portion 4100 formed as described above. That is, since the first mold 4001, the second mold 4002 and the third mold 4003 are formed through a single process while being fixed to the fixing portion 4200 rather than being individually processed, the first, second and third molds 4001, 4002 and 4003 have a uniform height as each other, especially at interfaces therebetween. As having a uniform height, upper surfaces of the first, second and third molds 4001, 4002 and 4003 may be coplanar with each other. In addition, since the first, second and third molds 4001, 4002 and 4003 have a uniform height as each other, especially at interfaces therebetween, a bottom surface step of the finally molded cover glass 1000 can be minimized compared to manufacturing the first to third molds through individual processes.

As described, in one or more exemplary embodiment of a method for manufacturing the cover glass according to the invention, a preliminary cover glass is molded by using a lower mold that includes a plurality of partial molds separable from each other such that curved portions of the finally-molded cover glass are bent to form an angle greater than 90 degrees with respect to a virtual line perpendicular to a flat portion of the finally-molded cover glass can be manufactured. In addition, the collection of partial molds used in the molding process of the cover glass can be separated from the finally-molded cover glass since the plurality of partial molds are separable from each other, and damage to the molded cover glass can be reduced or effectively prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mold comprising:
    a lower mold comprising:
        a plurality of mold portions removably disposed with each other and collectively forming an upper surface of the lower mold, the upper surface corresponding to a shape of a cover glass which is disposed on a curved display panel which displays an image, the shape of the cover glass comprising a curved portion at an end thereof, and
        a fixing portion comprising protruding portions spaced apart from each other and between which the plurality of mold portions are received to be spaced apart from each of the protruding portions; and
    an upper mold facing the lower mold,
    wherein
    the plurality of mold portions comprise a first mold, a second mold and a third mold assembled consecutively in order between the protruding portions of the fixing portion to form the upper surface of the lower mold,
    within the fixing portion, each of the first mold and the third mold are spaced apart from a respective protruding portion adjacent thereto, and
    within the lower mold:
        each of the first mold and the third mold includes a mold support portion and a mold curved portion which is curved away from the upper mold,
        the mold support portion extends further from the upper mold than the mold curved portion, and
        a thickness of the mold support portion is thicker than a thickness of the mold curved portion.

2. The mold of claim 1, wherein an outer edge of each of the first mold and the third mold which is closest to the respective protruding portion includes a curved surface.

3. The mold of claim 1, wherein among the first to third molds assembled consecutively in order between the protruding portions of the fixing portion to form the upper surface of the lower mold,
    an upper surface of each of the first to third molds comprises a flat portion facing the upper mold, and
    outer edges of the first mold and the third mold are curved at an angle of less than 90 degrees with respect to a virtual line perpendicular to the respective flat portion thereof.

4. The mold of claim 1, wherein the upper mold defines a lower surface facing the upper surface of the lower mold, a shape of the lower surface corresponding to a shape of the upper surface of the lower mold collectively formed by the first to third molds assembled consecutively in order between the protruding portions of the fixing portion, and
    outer edges of the lower surface of the upper mold are curved to correspond to the curved portion of the cover glass at the end thereof.

5. A mold comprising:
    a lower mold comprising:
        an upper surface corresponding to a shape of a cover glass which is disposed on a curved display panel which displays an image, the shape of the cover glass comprising a flat portion and curved portions which are at opposite edges of the flat portion, and
        a plurality of mold portions removably disposed with each other and collectively forming the upper surface of the lower mold; and
    an upper mold facing the lower mold,
    wherein
    the plurality of mold portions comprise a first mold, a second mold and a third mold consecutively in order to form the upper surface of the lower mold, and
    among the first to third molds consecutively in order to form the upper surface of the lower mold,
        each of the first to third molds comprises an upper mold surface at a flat portion facing the upper mold, the upper mold surfaces of the first to third molds being coplanar with each other to define a plane of the upper surface of the lower mold, and
        each of the first mold and the third mold further comprises:
            a mold curved portion which extends curved in a direction away from the upper mold, from an end of the flat portion to correspond to a respective curved portion of the cover glass and define an end surface of the mold curved portion,
            the flat portion extended further from the upper mold than the mold curved portion,
            a virtual straight line which is defined perpendicular to the plane of the upper surface and corresponding to the end of the flat portion, and
            the end surface of the mold curved portion forming an angle which is less than 90 degrees with respect to the virtual line.

6. The mold of claim 5, wherein
    the upper mold which faces the lower mold disposes the cover glass therebetween, and
    the cover glass which is disposed between the upper mold and the lower mold includes the curved portions respectively engaged with the mold curved portion-outer edge of the first mold which is curved at the angle of less than 90 degrees and the mold curved portion of the third mold which is curved at the angle of less than 90 degrees.

7. The mold of claim 6, wherein
    removal of the second mold from each of the first mold and the third mold provides a space between the first mold and the third mold into which the first mold or the third mold is movable along the cover glass, and
    movement of the first mold or the third mold respectively disengages the mold curved portion of the first mold which is curved at the angle of less than 90 degrees or the mold curved portion of the third mold which is curved at an angle of less than 90 degrees, from the respective curved portion of the cover glass.

8. The mold of claim 6, wherein
the lower mold further comprises a fixing portion removably disposed with each of the first mold, the second mold and the third mold, the fixing portion comprising protruding portions spaced apart from each other and between which the first mold, the second mold and the third mold are receivable,
the first mold, the second mold and the third mold which are received between the protruding portions disposes the mold curved portion of the first mold and the mold curved portion of the third mold spaced apart from a respective protruding portion closest thereto, and
the cover glass which is disposed between the upper mold and the lower mold further includes the curved portions of the cover glass between the mold curved portion of the first mold and the respective protruding portion closest thereto and between the mold curved portion of the third mold and the respective protruding portion closest thereto, respectively.

* * * * *